(12) United States Patent
Schindler

(10) Patent No.: US 6,746,605 B2
(45) Date of Patent: Jun. 8, 2004

(54) MULTI-ARRAYED VACUUM RECOVERY METHOD AND SYSTEM FOR GROUNDWATER WELLS

(75) Inventor: A. Russell Schindler, Traverse City, MI (US)

(73) Assignee: Remediation Technoliges, Inc., Traverse City, MI (US)

( * ) Notice: Subject to any disclaimer, the term of this patent is extended or adjusted under 35 U.S.C. 154(b) by 4 days.

(21) Appl. No.: 10/047,873

(22) Filed: Jan. 14, 2002

(65) Prior Publication Data

US 2002/0195401 A1 Dec. 26, 2002

Related U.S. Application Data

(60) Provisional application No. 60/296,540, filed on Jun. 6, 2001, provisional application No. 60/296,528, filed on Jun. 6, 2001, and provisional application No. 60/296,609, filed on Jun. 6, 2001.

(51) Int. Cl.$^7$ .................................................. C02F 1/40
(52) U.S. Cl. ..................... 210/620; 210/747; 210/94; 210/170; 405/128.2; 405/128.3; 405/128.45
(58) Field of Search .......................... 210/620, 747, 210/776, 170, 220, 242.3, 540, 94; 405/128.25, 128.3, 128.2, 128.45, 128.7

(56) References Cited

U.S. PATENT DOCUMENTS

| | | | | |
|---|---|---|---|---|
| 4,992,174 A | * | 2/1991 | Caplan et al. ............... 210/747 |
| 5,018,576 A | * | 5/1991 | Udell et al. .................. 210/747 |
| 5,173,092 A | * | 12/1992 | Rudder ........................ 210/170 |
| 5,221,159 A | * | 6/1993 | Billings et al. ......... 405/128.25 |
| 5,252,000 A | * | 10/1993 | Mohs ........................... 210/170 |
| 5,286,141 A | | 2/1994 | Vigneri |
| 5,389,267 A | * | 2/1995 | Gorelick et al. ............. 210/170 |
| 5,474,685 A | * | 12/1995 | Breslin ........................ 210/170 |
| 5,509,757 A | * | 4/1996 | Croy ........................ 405/128.2 |
| 5,622,450 A | * | 4/1997 | Grant, Jr. .................. 405/128.2 |
| 5,885,203 A | | 3/1999 | Pelletier |
| 5,989,414 A | * | 11/1999 | Bzorgi ........................ 210/170 |
| 6,100,382 A | | 8/2000 | Wolfe et al. |
| 6,155,276 A | | 12/2000 | Oglesby et al. |
| 6,207,073 B1 | | 3/2001 | Wolfe et al. |
| 6,254,785 B1 | | 7/2001 | Phifer et al. |
| 6,262,002 B1 | | 7/2001 | Carey |
| 6,319,882 B1 | | 11/2001 | Ivey |
| 6,464,005 B1 | * | 10/2002 | Ellis ....................... 405/128.25 |

* cited by examiner

Primary Examiner—Christopher Upton
(74) Attorney, Agent, or Firm—Jeffrey J. Chapp

(57) ABSTRACT

A method and system for removing free phrase product from the surface of a subterranean body of water includes a plurality of extraction sites. The extraction sites extend below ground and intersect the free product. Each of the plurality of extraction sites is in communication with a vacuum supply which provides suction to remove free product from the surface of the groundwater.

31 Claims, 2 Drawing Sheets

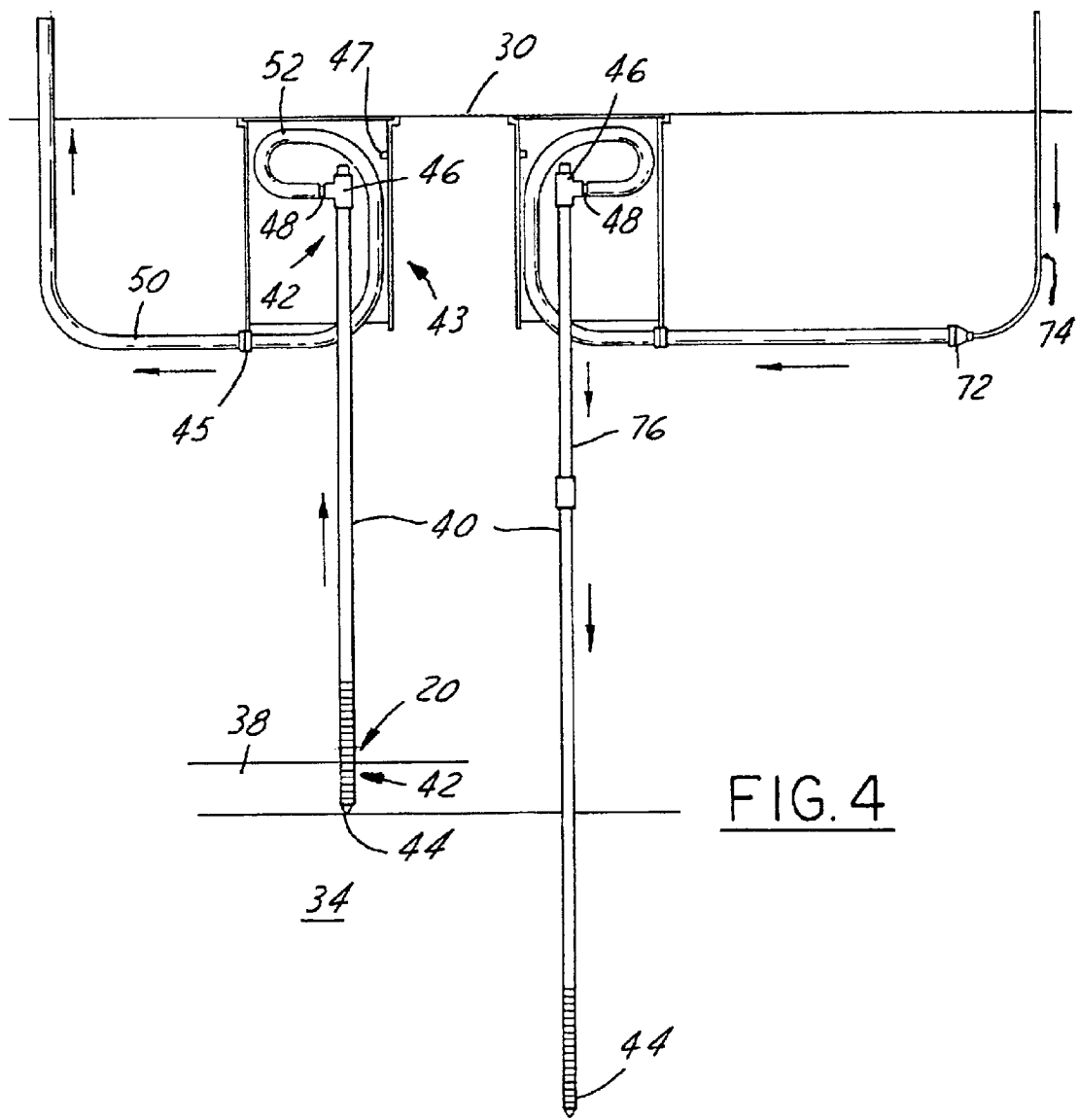

MULTI-ARRAYED VACUUM RECOVERY METHOD AND SYSTEM FOR GROUNDWATER WELLS

CROSS-REFERENCE TO RELATED APPLICATIONS

The present invention claims priority from U.S. Provisional Application Serial No. 60/296,540, entitled "Direct Oxygen Injection Technology Systems", filed Jun. 6, 2001, U.S. Provisional Application Serial No. 60/296,528, entitled "Enhanced Dissolved Oxygen Technology Systems", filed Jun. 6, 2001, and U.S. Provisional Application Serial No. 60/296,609, entitled "Multi-Arrayed Vacuum Recovery Systems," filed Jun. 6, 2001.

TECHNICAL FIELD

The present invention relates to a method and system for recovering free product from a groundwater well while minimizing the removal of groundwater from the well.

BACKGROUND ART

Groundwater contamination, typically arising from petroleum storage tank spills or from intentional or accidental discharge of liquid hydrocarbons or compositions containing same, has become a problem of increasing concern. This type of contamination occurs not only at industrial complexes, but also in suburban neighborhoods, which would appear to be havens from such phenomena. The source of contamination in suburban neighborhoods or areas is very commonly automobile service station sites at which antiquated or abandoned storage tanks have released gasoline, fuel oils, lubricants, and the like into the local groundwater. Other common sources of such noxious materials can include dry cleaning establishments and/or manufacturers or distributors of the tetrachloroethane which is used in the dry cleaning process.

Various remediation techniques have been utilized in the past for the treatment of contaminated groundwater in order to reduce or eliminate the contaminants, such as COCs. One of the most widely used systems is one based on so-called "pump and treat" technology. These systems withdraw the contaminated groundwater and a phase-separated product from a recovery well located in the groundwater and pump it to an above ground treatment facility. Thereafter, various treatment techniques, as are well known, are used to remove contaminants from the displaced groundwater. These "pump and treat" systems are relatively expensive to install and require that the remaining contaminants, which have been separated from the groundwater, be disposed in an environmentally friendly manner. These processes further increase the cost of the techniques.

One example of a known remediation system is disclosed in U.S. Pat. No. 5,286,141. The '141 patent teaches oxidizing the source of groundwater contamination to harmless constituents by locating a plurality of mutually spaced wells into a groundwater region. A treating flow of hydrogen peroxide solution is provided into the groundwater from one or more wells. The treating flow typically contains reaction surface enhancing reagents, which provide increased surfaces at which the reaction between the hydrogen peroxide and the hydrocarbon contaminants may occur. Further, a catalytic agent is also preferably incorporated into the treating solution or as a pre-injection into the groundwater region to promote the desired reaction between the hydrogen peroxide and hydrocarbons.

Recently, there has also been increasing interest in bioremediation technology. However, its use in treating groundwater has been relatively ineffective due to the complexity of the procedures and equipment required, including expensive and complex reactors. Moreover, current bioremediation techniques can cause adverse geochemical reactions and can introduce new toxic compounds into the groundwater. Additionally, current bioremediation systems, still require the use of non-organic catalysts or additives to cause the process to be completed in a reasonable period of time. These catalysts or additives raise other contaminant issues with respect to the groundwater.

It is known that naturally growing bacteria in the groundwater can break down groundwater contaminants. However, these bacteria are not always present in large enough quantities to be effective and can also be absent altogether. Moreover, these bacteria feed off oxygen and the lack of oxygen is the single biggest limiting factor on the growth of the bacterial population and therefore contaminant decrease. Ambient air, which is comprised of about 21% percent oxygen, only results in approximately 10–12 ppm of dissolved oxygen in the groundwater and thus is not sufficient to adequately destroy or reduce contaminants. Various attempts to increase the amount of oxygen by utilizing oxygen releasing compounds have been tried, but these oxygen releasing compounds, such as magnesium peroxide or calcium peroxide are expensive. Further, these oxygen releasing compounds only produce a small amount of usable oxygen and therefore do not significantly increase the bacterial population.

In some instances, the remediation of groundwater can be further complicated by large amounts of free product in the area to be remediated. Thus, in addition to the contamination that is present in the groundwater, a thicker contaminant is present on the top surface of the water, which has not yet been dissolved. The existence of the free product can further increase the time required to remediate groundwell water. Thus, it is desirable to remove the free product prior to the step of remediation. One method for the removal of free product requires the removal of free product and groundwater and then separating it above ground at a treatment facility, as discussed above. This typically requires a separate building and holding tank, which are costly and take up considerable space. Moreover, these prior removal methods also remove large amounts of groundwater as there is no real way to distinguish between where the free product ends and where the water begins. These methods are thus both expensive and inefficient.

SUMMARY OF THE INVENTION

It is therefore an object of the present invention to provide a method and system for removing increased amounts of free product from a groundwater well prior to groundwater remediation treatment.

It is another object of the present invention to provide a method and system for removing increased amounts of free product from a groundwater well, while minimizing the removal of groundwater.

It is still another object of the present invention to provide a method and system for removing increased amounts of free product from a groundwater well that is less expensive and more efficient than prior removal systems.

It is a further object of the present invention to provide a method and system for removing free product from a groundwater well that is relatively easy and inexpensive to install and operate.

It is yet another object of the present invention to provide a method and system for removing free product from a groundwater well that can be installed with minimal site disturbance.

It is still a further object of the present invention to provide a method and system for removing free product from a groundwater well that can be easily and readily converted to a bioremedial groundwater remediation system.

In accordance with the above and other objects of the present invention a method and system for removing free product from a groundwater well is provided. The method includes determining whether a subterranean body of groundwater is contaminated. If the groundwater is contaminated, it is monitored to determine whether free product that has yet to dissolve into the groundwater is located on the surface thereof. If free product is present, a plurality of extraction points are placed below ground and into communication with the body of groundwater. Each of the plurality of extraction points is positioned to maximize communication with the free product and minimize communication with the groundwater. A vacuum source is placed in communication with each of the plurality of extraction points to remove free product from the well through the extraction points. The flow of fluid removed from the well is periodically monitored to ensure that the extraction points are properly positioned with respect to the surface of the groundwater. The proper position is preferably determined by viewing a clear section of the extraction hose to determine if free product and water is being transported along the extraction hose by "entrained flow." Entrained flow is the stream of fluid droplets in high velocity air stream.

The system includes a monitoring well in communication with a subterranean body of groundwater to determine whether any free product exists on the surface of the groundwater as well as to determine the thickness of any free product. A plurality of extraction tubes extend below ground to intersect the free product. Each of the tubes has a first end that is located at a respective extraction point where the tube intersects the free product at a plurality of extraction points. Each of the tubes has a second end that is in communication with a vacuum source to draw free product from the surface of the groundwater. Each of the tubes has a clear portion adjacent the second end that allows the entrained flow stream extracted from the plurality of extraction points to be viewed.

The above objects and other objects, features and advantages of the present invention will be apparent from the following detailed description of best made for carrying out the invention to be taken in connection with the accompanying drawings and appended claims.

BRIEF DESCRIPTION OF THE DRAWINGS

FIG. 3 is a schematic illustration of a pair of extraction points in accordance with a preferred embodiment of the present invention; and FIG. 4 is an illustration of a modification of a multi-array vacuum system to a direct oxygen injection bioremediation system in accordance with a preferred embodiment of the present invention.

DETAILED DESCRIPTION OF THE PREFERRED EMBODIMENT

Referring now to the Figures which illustrate a system for removing free product from a contaminated groundwater well in accordance with the present invention. Free product, as is known, includes gasoline, diesel fuel, or other petroleum that has not yet dissolved in the groundwater and is resting or floating on the surface of the groundwater. Obviously, the disclosed system and method may be utilized to remove other types of free product that are present on top of contaminated groundwater or in the surrounding soil. However, it should be understood, that the system 10 can also be used to clean up other contaminates or constituents on top of or in the in groundwater and may alternatively be used for a variety of other purposes, such as the clean up of soil contaminants.

Figure 1:
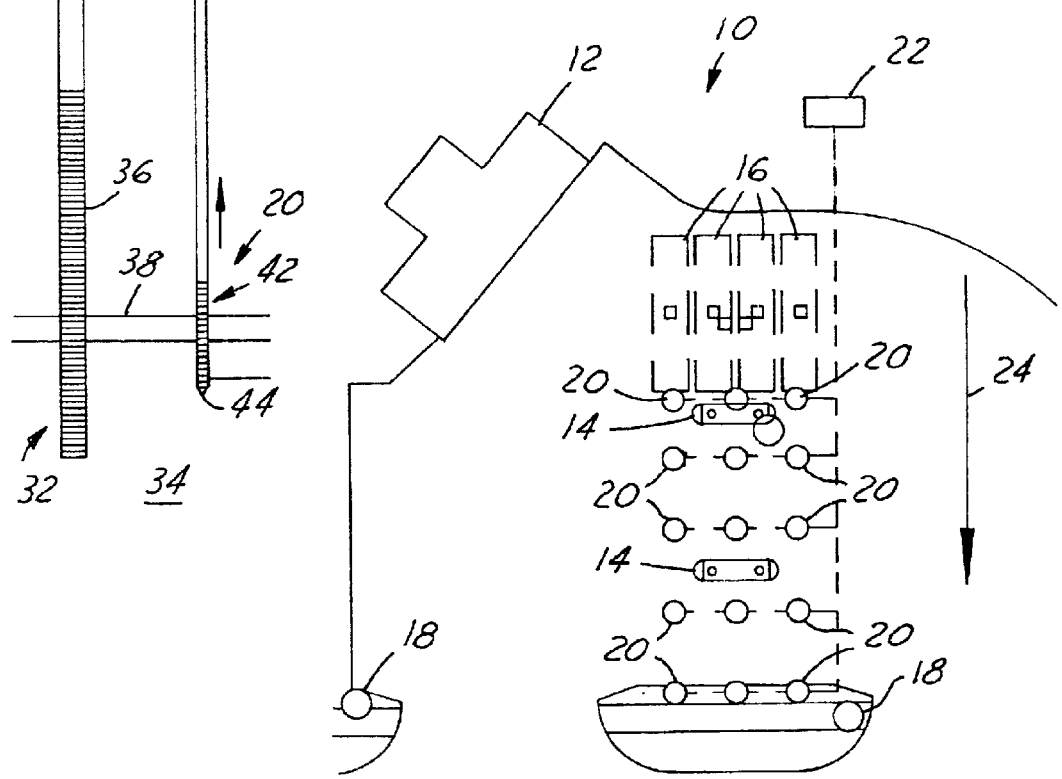
FIG. 1 is a schematic illustration of an exemplary installation of a multi-array vacuum system in accordance with a preferred embodiment of the present invention.

Referring now to FIG. 1 which illustrates an exemplary installation of the system 10 in accordance with the present invention. The system shown in FIG. 1 is preferably installed at a site, such as a former service station. It will be understood that the system can be installed at any other location where contaminated groundwater exists. Once a particular site has been determined to have groundwater that is contaminated with petroleum or other contaminants, whether through accidental or intentional spillage the preferred system can be utilized to assist in the removal of the contaminants. As is known, the groundwater can be tested through the use of a monitoring well to determine whether or not the groundwater has been contaminated. Obviously, other testing methods may be utilized in accordance with the present invention. For example, one way for determining the existence of contaminants is the absence or depletion of oxygen which indicates that naturally existing bacteria are feeding on the oxygen in an effort to breakdown the contaminants. It can be assumed that a body of groundwater has unacceptable levels of contamination when the percentage of oxygen in and around the groundwater is in the order of 0%–1%.

Once it has been determined that the body of groundwater has been contaminated, the body of groundwater is tested to determine whether free product exists on the surface of the groundwater, which has not yet been dissolved in the groundwater. The determination of whether free product exists can be accomplished in a variety of ways, however, one preferred way, as discussed in more detail below is through the use of a monitoring well. As will be understood, a variety of other testing methods for detecting the presence of free product may also be utilized.

Once it has been determined that an amount of free product exists that needs to be evacuated, in accordance with the present invention, the location of one or more points for removing the free product can be determined. The location of the evacuation points can be determined through a variety of different methods. Preferably, however, the evacuation points are located in a grid that takes into account the direction and flow rate of groundwater flow. By taking into account the groundwater flow, evacuation sites will be positioned to prevent contaminants from spreading. Typical grid determination is based on soil types and the estimated radius of influence per point. The density of the points in the grid is preferably determined based on a compromise that balances the cost of construction verses the costs of operation.

Accordingly, as shown in FIG. 1, the exemplary system 10 is installed at a gas station 12 having a plurality of dispenser islands 14. The dispenser islands 14 were provided with petroleum from a plurality of storage tanks 16, which are typically located below ground. A plurality of monitoring wells 18 are utilized to determine the extent and location of any contaminants so that the system usage can be maximized. In FIG. 1, five (5) monitoring wells 18 are illustrated. Obviously, any number of wells can be created. A plurality of evacuation sites 20 are then created and are preferably located in a grid pattern as shown (i.e. columns and rows). Each of the evacuation sites 20 is in communication with a vacuum source 22 to remove free product from the groundwater. The arrow 24 designates the direction of groundwater flow.

Figure 2:
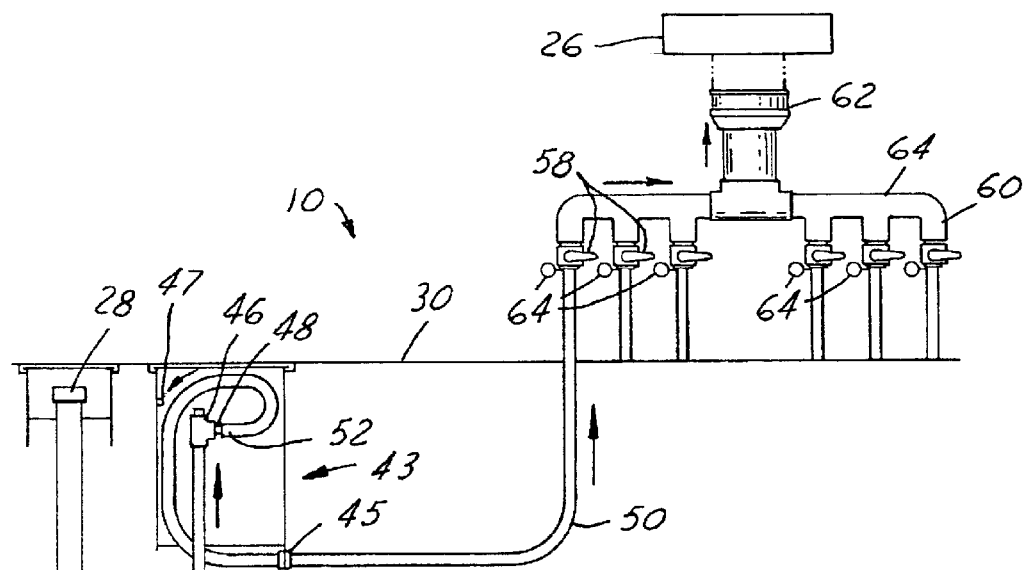
FIG. 2 is a schematic illustration of the apparatus of a multi-array vacuum system in accordance with a preferred embodiment of the present invention.

Referring now to FIG. 2 which illustrates the apparatus of the preferred system 10 in accordance with the present invention. The system 10 preferably includes a plurality of monitoring wells 18 disposed throughout the site of the contaminated groundwater well. It will be appreciated that any number of monitoring wells 18 may be utilized. The system 10 also includes a plurality of extraction points 20 disposed throughout the site, as discussed above. Additionally, any number of extraction points 20 may be utilized. Each of the extraction points 20 is in communication with a vacuum source 26 to assist in the removal of free product from the extraction point. The vacuum supply 26 is preferably a high-powered source, such as a VAC-truck. However, it will be understood that any commercially available vacuum source that provides sufficient vacuum power can be utilized.

Each of the monitoring wells 18 has an upper end portion 28 located adjacent the ground surface 30 and a lower end 32 extends below ground and into communication with a subterranean body of groundwater 34. The upper end portion 28 is disposed below the ground surface 30, but is easily accessible from above ground. Each of the monitoring wells is preferably formed from galvanized pipe or the like, and includes a screen portion 36 located at the lower end 32. This screen portion 36 allows groundwater as well as any free product 38 present on the surface of the groundwater to communicate with the inside of the tube. In an exemplary monitoring well, the tube is 1 inch in diameter and the screen portion 36 is preferably 12 inches long feet long. It will be understood that the size can vary as needed.

Each of the extraction points 20 includes a tubular member 40 that extends from below the ground surface 30 and into communication with the body of groundwater 34. Each of the tubes 40 has an upper end portion 41 located adjacent to and below the ground surface 30 and a lower portion 42 that communicates with the free product 38 on the surface of the groundwater 34. The lower end portion 42 has a tip portion 44. The tubes 40 are preferably constructed of a galvanized stainless steel material and the lower end portion 42 preferably includes a stainless steel screen located thereon. It will be understood that the material and size of the tube may vary. The screen is intended to be positioned to intersect the free product and allow passage of the free product through the screen and into the tube interior. The tube 40 is preferably capable of being moved up and down to adjust for varying levels of free product 38 as discussed in more detail below. The tube 40 is preferably capable of being adjusted upwardly and downwardly about one foot to 1.5 feet, however, this may also vary.

The extraction points 20 and the extraction tubes 40 can be installed by any of a variety of methods, including typical hollow stem auger with sand backfill. This is primarily for sites interbedded with clays and silts. Alternatively, the extraction tubes 40 may be installed by known GeoProbe® (GeoProbe is a registered trademark of KEJR Engineering, Inc. of Kansas) installation techniques.

The upper end portion 41 is preferably located below the ground surface 30, but accessible from above ground. The upper end portion 41 of the tube 40 a coupling joint 46 attached thereto in communication with a coupling joint 46 having a hose barb 48 extending therefrom. The hose barb 48 is intended to engage a vacuum hose 50 attached thereto. The vacuum hose 50 is coupled at a first end 52 to the hose barb 48 and at a second end 54 to a manifold system 56. The upper portion 41 of each tube 40 is preferably disposed in a vault 43 that extends approximately eighteen inches below the ground. The vault provides protection to the upper portion 42 as well as allowing access to the tube 40 for adjustment purposes. The vault 43 is preferably coupled to the flexible hose 50 by a coupler 45 that maintains the clear vacuum hose 50 in relatively stable position with respect to the vault 43. The hose 50 is preferably located at least one foot below the ground surface 30. This helps to prevent inadvertent damage to the hose due to a puncture. Each vault 43 has a benchmark 47 located therein, which is preferably surveyed to the other points as well as to the monitoring well to properly align the tips 44 of each tube 40 with respect to the groundwater 34.

The manifold system 56 includes a plurality of inlet passages 60 that are intended to communicate with a respective tube 40 through a respective vacuum hose 50 to receive free product from a respective extraction point 20. Each inlet passage 60 has a valve 58 associated therewith that either opens or closes communication between the inlet passage and a unitary outlet 62. Each valve 58 is preferably a ball valve. However, any other type of commercially available valve could be utilized. Each inlet passage 60 also includes a pressure/vacuum gauge 64 associated therewith that allows for the monitoring of pressure/vacuum at each inlet 60. Each of the inlet passages 60 opens to a single tube 66, which is in communication with the unitary outlet 62. An exemplary tube 66 is two inches in diameter, however any other suitable size may be utilized. The unitary outlet 62 is in turn in communication with the vacuum source 26. The manifold system 56 is preferably comprised of PVC piping or the like.

The vacuum hoses 50 are preferably formed of a flexible translucent or transparent material such that the flow of free product from the respective extraction points 20 can be viewed. The monitoring of the fluid in the vacuum hose 50, otherwise referred to as the entrained flow, allows for the determination of whether each of the extraction points 20 is located in the proper position. The clear flexible hose 50 is preferably a one inch diameter hose and is constructed of polypropylene or other suitable material. However, any other suitably sized hose constructed of a wide range of materials may be utilized. Monitoring the entrained flow will allow for a determination that the system is only removing free product 38 and only a minimal amount of water 34.

Referring now to FIG. 3 which illustrates in more detail the evacuation of free product 38 through each of the extraction points 20. As discussed above, each of the tubes 40 is in communication with the vacuum source 26 which provides vacuum to remove any free product 38 from the surface of the groundwater 34. Thus, after the thickness of free product 38 on the surface of the groundwater 34 has been determined by virtue of the monitoring well 18, each of the tips 44 of the tubes 40 is located such that it intersects the free product 38 at a location just above the groundwater 34 and is transferred up the tube 40 and through the hose 50 to the vacuum source 26. The clear hose 50 can be visually inspected to monitor the entrained flow. One of skill in the art will understand that the entrained flow consists of free product only and not excess water when little droplets of water are visible in the hose 50. If this condition is not satisfied, i.e., too much water is removed or there are no water droplets at all, the tube 40 can be raised or lowered as is necessary. After the vacuum source 26 has been actuated, the free product 38 immediately surrounding each of the tubes 40 will be evacuated.

As the free product 38 is evacuated, a void or cone 70 is formed around each of the tips 44 of the tubes 40. This cone 70 is due to the suction supplied through the screen 44 from the vacuum source 26. Thereafter, as the vacuum source 26 continues to operate, the free product 38 located adjacent each of the extraction points 20 will flow toward the source of the vacuum, as generally indicated by the arrows in FIG. 3. Because the rate of free product recovery or flow back into the cone is slower than the rate of extraction, free product will continue to flow towards each respective extraction point until the vacuum source is removed or free product is no longer effected by the vacuum system. It should be noted that the free product is recovered in both liquid phase and vapor phase by the MAV system and the related extraction points. Accordingly, the cone 70 remains and is not filled by the free product 26.

Referring now to FIG. 4 which illustrates the modification or conversion of the multi-array vacuum system 10 of the present invention to a direct oxygen injection system for remediating the groundwater of contamination. Thus, after the free product 38 has been removed from the surface of the contaminated water 34, the water 34 itself has to be cleaned of remaining dissolved contamination. The configuration of the present system allows for an easy and inexpensive change over to a remediation system.

Accordingly, as shown, to convert the multi-array vacuum system 10 system to a groundwater remediation system, the manifold 56 and the vacuum supply 26 must be disconnected. Thereafter, an expander 72 is utilized to fit the hose 50 to a portion of tubing 74 which is in communication with a source of liquid oxygen. Further, the hose 40 has an extension pipe 76 attached to the upper portion 42 of the tube 40 to allow the tube 40 to be lowered into and below the groundwater 34. The liquid oxygen 76 is allowed to turn to vapor and then injected through the tube 40 and into the groundwater. After the extension pipe 76 has been attached to the tube 40, the extension pipe 76 and the tube 40 are driven downwardly until the screen is approximately 10 feet below the water table or below the previously identified depth of contamination.

The operation of the direct oxygen injection remediation system is disclosed and described in detail in copending U.S. patent application Ser. No. 09/903,477 entitled "Direct Oxygen Injection Groundwater Remediation Method and System," which is hereby incorporated by reference as though set forth fully herein. Additionally, the direct oxygen injection remediation system can be enhanced such as disclosed and described in copending U.S. patent application Ser. No. 09/919,403 entitled "Enhanced Dissolved Oxygen Groundwater Remediation Method and System," which is hereby incorporated by reference as though fully set in.

The present system can thus be easily adjusted with fluctuating free product levels and thicknesses, maximizing product recovery and minimizing recovery of groundwater. The system also provides the benefit of minimum on-site construction time as well as minimum site description. The system is adjustable to concentrate on specific areas or an entire product plume. The system can recover both free phrase product and lingering product in the capillary fringe. The system can also be operated as a standard soil vapor extraction system to clean up soil "hot spots".

While particular embodiments of the invention have been shown and described, numerous variations and alternate embodiments will occur to those skilled in the art. Accordingly, it is intended that the invention be limited only in terms of the appended claims.

What is claimed is:

1. A method of removing free product from a groundwater, comprising:
   determining the existence of any free product in the groundwater;
   providing at least one extraction point in communication with the collection of free product;
   placing said at least one extraction point in communication with a vacuum source; and
   removing the free product from the groundwater via a non-float style mechanism using an entrained flow of fluid droplets in an air stream.

2. The method of claim 1, further comprising:
   providing a plurality of extraction points in communication with the collection of free product.

3. The method of claim 1, wherein the free product is located on top of a surface of the groundwater.

4. The method of claim 3, further comprising:
   disposing said at least one extraction point in communication with the free product just above said surface of the groundwater.

5. The method of claim 4, further comprising:
   monitoring an entrained flow of free product from said at least one extraction point to said vacuum source.

6. A method as in claim 5 wherein monitoring said entrained flow of free product is performed via a clear mechanism disposed between said at least one extraction point and said vacuum source.

7. The method of claim 1, wherein the free product is located in soil in the groundwater.

8. The method of claim 1, further comprising:
   adjusting the depth of said at least one extraction point as required.

9. The method of claim 1, further comprising:
   removing said vacuum source and connecting said at least one extraction point to a source of oxygen to remediate the groundwater.

10. A system for recovering free product from subterranean groundwater, comprising:
    a monitoring well in communication with the groundwater to determine the existence of any free product located therein;
    at least one extraction point extending below ground and into communication with the groundwater; and
    a vacuum source in communication with said at least one extraction point to supply suction and create an entrained flow condition of fluid droplets in an air stream free product from the groundwater through said at least one extraction point.

11. The system of claim 10, further comprising:
    a plurality of extraction points extending below ground and into communication with the groundwater.

12. The system of claim 11, further comprising:
    a manifold having a plurality of inlet portions each in communication with a respective one of said plurality of extraction points and an outlet portion in communication with said vacuum source.

13. The system of claim 10, wherein said free product is located on a surface of the groundwater in a groundwell.

14. The system of claim 10, wherein said free product is located in soil in the groundwater.

15. The system of claim 10, wherein said vacuum source is a vac truck.

16. The system of claim 10, wherein said at least one extraction point is located in the groundwater to provide an entrained flow of free product.

17. The system of claim 10, further comprising:
a clear hose disposed between said at least one extraction point and said vacuum source allowing the fluid flow to be monitored.

18. The system of claim 10, wherein said at least one extraction point includes a tubular member extending downward from below ground and into communication with the free product.

19. The method of claim 18, wherein said tubular member has a lower portion with a screen disposed thereon to allow free product to flow from the groundwater into said tubular member.

20. The system of claim 10, wherein the height of said at least one extraction point is adjustable.

21. A system as in claim 10 wherein said vacuum source draws non-vapor fluids from the groundwater.

22. A system as in claim 10 wherein said vacuum source draws liquid and vapor fluids from the groundwater.

23. A system for recovering free product from a subterranean body of groundwater, comprising:
at least one monitoring well in communication with the groundwater to determine the existence of any free product located therein;
at least one extraction tube extending downward from below ground to form an extraction point adjacent the groundwater; and
a vacuum source in communication with said at least one extraction tube to draw an entrained flow of the free product and vapor from the surface of the groundwater via each of said at least one extraction tube.

24. The system of claim 23, further comprising:
a plurality of extraction tubes extending downward from below ground to form respective extraction points adjacent the groundwater.

25. The system of claim 24, wherein each of said plurality of inlet portions has a valve associated therewith to control flow of fluid therethrough.

26. The system of claim 24, further comprising:
a manifold having a plurality of inlet portions each in communication with a respective one of said plurality of extraction points and an outlet portion in communication with said vacuum source.

27. The system of claim 26, wherein a clear hose connects an upper end of each of said plurality of extraction points to a respective one of said plurality of inlet portions of said manifold.

28. The system of claim 23, wherein said at least one extraction tube has a lower portion with a screen disposed thereon to allow free product to flow from the groundwater into said tubular member.

29. The system of claim 23, wherein said at least one extraction tube can be adjusted in an upward and downward direction.

30. A system as in claim 23 further comprising:
a clear mechanism disposed between said extraction point and said vacuum source for monitoring fluid flow.

31. A method of removing free product from a groundwater, comprising:
determining the existence of any free product in the groundwater;
providing at least one extraction point in communication with the collection of free product;
placing said at least one extraction point in communication with a vacuum source; and
removing the free product from the groundwater utilizing an entrained flow of fluid droplets in an air stream.

* * * * *